United States Patent Office 2,814,601
Patented Nov. 26, 1957

2,814,601

ORGANOPOLYSILOXANE ADHESIVE AND PRESSURE-SENSITIVE ADHESIVE TAPE CONTAINING SAME

Chester C. Currie and Joseph W. Keil, Midland, Mich., assignors to Dow Corning Corporation, Midland, Mich., a corporation of Michigan No Drawing. Application April 29, 1954, Serial No. 426,554

6 Claims. (Cl. 260—29.1)

This invention relates to siloxane compositions which are useful as pressure sensitive and permanent bond adhesives.

The term "pressure sensitive" as used herein refers to adhesives which can be stripped from a surface and readhered (i. e., behaves like the adhesive on "Scotch tape"). The term "permanent bond" has reference to an adhesive which actually cements two surfaces together (i. e., behaves like glue).

Organopolysiloxane rubbers have come into extensive use in the automotive industry because of their resistance to both high and low temperatures, their resistance to deterioration by weather and their excellent electrical properties. However, one of the perennial problems which has existed from the beginning of commercial use of siloxane rubbers has been that of making a satisfactory adhesive which would set at room temperature and satisfactorily bond organosiloxane rubber to metals, particularly to aluminum. Such an adhesive would need to have essentially the same thermal stability and inertness of the polysiloxane rubber. It would have to cure at room temperature and it would have to give a satisfactory bond. Prior to the advent of this invention there was no known adhesive which would fill these three requirements.

Another need which was long felt in the silicone industry was that of a satisfactory pressure sensitive siloxane adhesive. The first successful such adhesive is that described and claimed in the copending application of John F. Dexter, Serial No. 346,277, now U. S. Patent No. 2,736,721. These materials comprise essentially the combination of a high molecular weight organopolysiloxane having at least 1 million cs. viscosity and a soluble silicone resin comprising a combination of triorganosilyl units and $SiO_2$ units.

It has now been discovered that pressure sensitive adhesives are obtained by employing hydroxyl end-blocked organopolysiloxane fluids having a viscosity of less than 1 million cs. The beneficial results obtained by using these hydroxyl end-blocked fluids in adhesives is most unexpected.

It is an object of this invention to prepare an adhesive which will satisfactorily bond organopolysiloxane rubber to metals. Another object of this invention is to prepare an adhesive which will give permanent bonds between a wide variety of materials. Another object of this invention is to provide a room temperature curing adhesive. Another object of this invention is to provide siloxane pressure sensitive adhesives. Other objects and advantages will be apparent from the following description.

This invention relates to a composition of matter composed essentially of (1) from 40 to 75% by weight of a benzene soluble resin copolymer of $SiO_2$ units and $R_3SiO_{.5}$ units where R is of the group methyl, ethyl, propyl, vinyl and phenyl radicals, at least 90% of the total R radicals being aliphatic and in which copolymer resin the ratio of $R_3SiO_{.5}$ units to $SiO_2$ units is from 0.6:1 to 0.9:1 inclusive and (2) from 25 to 60% by weight of a hydroxyl end-blocked diorganopolysiloxane fluid of from 5,000 to less than 1,000,000 cs. viscosity at 25° C. in which fluid the organic radicals are of the group methyl, ethyl, vinyl and phenyl radicals at least 75% of the total number of radicals being aliphatic.

The above compositions are prepared by merely mixing siloxanes (1) and (2). This may be accomplished by any suitable means but in general it is preferable to employ a mutual solvent such as aromatic and aliphatic hydrocarbon solvents. As soon as the two ingredients are mixed the composition is ready for use as a pressure sensitive adhesive without further treatment. It is simply applied by any suitable means to the surfaces to be adhered and the surfaces are then brought together. If the adhesive is in solvent, it is best to allow the solvent to evaporate before adhering the surfaces. If desired, the coating may be cured for a short time before use, say for 5 minutes at 150° C., although this curing is not essential. Likewise one may if desired, employ a catalyst such as lead, zinc, or tin naphthenates to assist in the curing.

Resin copolymer (1) of this invention is a two component copolymer composed essentially of $SiO_2$ units and triorganosilyl units in the above defined ratio. Satisfactory adhesives are not obtained when the ratio of the units is outside the defined range. The triorganosilyl units which are operative in this invention are, for example, trimethylsiloxane, triethylsiloxane, methylvinylpropylsiloxane, divinylmethylsiloxane, phenyldimethylsiloxane and diphenylmethylsiloxane. It should be understood that two or more of the various organosiloxanes may be present in the resin. It is preferred that the number of phenyl radicals should not exceed 10% of the total number of organo radicals in the triorganosilyl units.

Resin copolymers (1) may be prepared by any of the known processes such as by cohydrolysis or by the method set forth in U. S. Patent 2,676,182 which briefly comprises reacting triorganosilanes or siloxanes with a silica hydrosol. This method is preferred.

Siloxanes (2) are hydroxyl end-blocked diorganopolysiloxanes having the formula $HO(R_2SiO)_xH$. For the purpose of this invention these fluids must have a viscosity of at least 5,000 cs. and less than 1,000,000 cs. Viscosities outside of these ranges do not give the desired products. Specific examples of hydroxyl end-blocked siloxanes which are operative herein are dimethylsiloxane, diethylsiloxane, ethylmethylsiloxane, propylmethylsiloxane, and vinylmethylsiloxane. The siloxanes may be either homopolymeric or copolymeric. They may also contain limited amounts of phenylmethylsiloxane and diphenylsiloxane but the number of phenyl groups should not exceed 25% of the total number of organic radicals in the siloxane.

These hydroxyl fluids may be prepared by any of the methods known to the art but the best method for preparing them is that described and claimed in the copending application of J. Franklin Hyde et al. Serial Number 426,560, now U. S. Patent No. 2,779,776, filed simultaneously herewith. Briefly this comprises reacting the desired siloxane with an aqueous acid in a closed system until the viscosity of the siloxane has become essentially constant and thereafter washing the product free of acid.

In order to prepare an adhesive which will give a permanent bond, it is necessary to include within the compositions of this invention a cross-linking agent. For the purpose of this invention the cross-linking agents employed are alkoxy polysilicates in which the alkoxy group contains from 1 to 5 inclusive carbon atoms and/or hydrogen bearing siloxanes of the formula

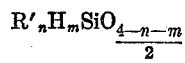

in which R' is of the group methyl, ethyl, propyl, vinyl and phenyl, n has an average value from 1 to 2.3, m has an average value from .2 to 1 and the total of $n+m$ is from 1.9 to 2.5 inclusive. These cross-linking compositions are employed in amount from .5 to 6% by weight based on the combined weights of siloxanes (1) and (2). In addition the composition should contain a curing catalyst. These may be employed in any desired amount but it is preferable to use them in amount less than 5% by weight based on the total weight of siloxanes (1) and (2).

Polysilicates which are suitable cross-linking agents in the compositions of this invention are, for example, methylpolysilicates, ethylpolysilicates, propylpolysilicates, butylpolysilicates and amylpolysilicates. These materials are commercially available and they preferably should be substantially devolatilized before use in the compositions of this invention.

The hydrogen bearing siloxanes which are operative herein are, for example, methylhydrogenpolysiloxane, ethylhydrogenpolysiloxane, phenylhydrogenpolysiloxane, vinylhydrogenpolysiloxane, propylhydrogenpolysiloxane, copolymers of dimethylsiloxane, ethylhydrogensiloxane, and dimethylhydrogensiloxane, copolymers having the units $HSiO_{1.5}$, $Me_2SiO$ and $C_6H_5Me_2SiO_{.5}$ and copolymers of methylvinylsiloxane, methylhydrogensiloxane, and trimethylsiloxane. The hydrogen-containing silanes should be either fluid or soluble in hydrocarbon solvents in order that they may be properly dispersed in the adhesive composition.

Suitable catalysts which may be employed are those normally employed to cure organopolysiloxanes such as, for example, alkali metal hydroxides, ferric chloride, aluminum chloride, butyl borates, metallic salts of carboxylic acids and quaternary ammonium compounds. The preferred catalysts are the carboxylic acid salts of metals ranging from lead to manganese inclusive in the electromotive series of metals in which salts the acid radicals have less than 16 carbon atoms. Specific examples of such salts are lead naphthenate, cobalt naphthenate, zinc naphthenate, iron 2-ethylhexoate, lead 2-ethylhexoate, chromium octoate, dibutyl tin dibenzoate, dibutyl tin adipate, lead sebacate and dibutyl tin dilactate.

The permanent bonding adhesives are prepared by merely mixing siloxanes (1) and (2) with the above cross-linking agents and the catalyst. The composition will then cure automatically at normal temperatures producing a permanent bond. The catalyst should not be incorporated into the mixture until a short time before use in order to prevent premature gelation. The preferred method of mixing the ingredients is to employ a common solvent such as aromatic or aliphatic hydrocarbon solvents.

In applying the adhesive the surfaces to be bonded should be thoroughly cleaned of foreign materials, and a coating of the adhesive should be applied preferably to each surface. The solvent should be allowed to evaporate until a tacky film is obtained and the two surfaces to be bonded are then brought together. A bond will be formed which will reach maximum strength in 24 hours or less.

The adhesives of this invention, both the pressure sensitive and the permanent bond type, will adhere to any known solid surface. Thus they may be used on such varied surfaces as, for example, those of glass, steel, aluminum, iron, fluorocarbon polymers, urea-formaldehyde and melamine-formaldehyde polymers, paper, leather, acrylic polymers, polyethers, polyesters, polyamides, polythenes such as polyethylene and organic and inorganic materials in general. The adhesives of this invention may be employed in the fabrication of cable insulation, transformers and laminates. They are particularly adaptable for adhering silicone rubber to metal surfaces thereby substantially advancing the applicability of silicone rubber in the automotive and other industries. The adhesives are useful at temperatures ranging from $-70°$ C. to upwards of $300°$ C.

The adhesives of this invention are particularly adaptable for the preparation of adhesive tapes. Due to the fact that these materials will adhere to any known surface, any flexible material is suitable for use as the tape backing. Specific examples of backing materials which can be employed are inorganic materials such as foils of metals such as aluminum, lead, platinum, gold and tin; glass cloth and glass cloth which has been coated with organosilicon resins and elastomers; asbestos tapes and organic materials such as cellulose esters such as cellulose acetate, cellulose butyrate, cellulose nitrate, and cellulose propionate; cellulose ethers such as ethyl cellulose, butyl cellulose and benzyl cellulose; vinyl polymers such as polyvinylchloride, polyvinyl alcohol and copolymers of vinyl choride-vinyl acetate and vinyl chloride-vinylidene chloride; polystyrene; polyamides; polyesters such as ethylene glycol-terephthalates; polyethylene; fluorocarbon polymers such as polytetrafluoroethylene and polychlorotrifluoroethylene; organic elastomers such as natural rubber, GRS, Buna-S, chloroprene, neoprene, butadiene-styrene copolymers, acrylo-nitrile-butadiene copolymers and mixtures thereof, polysiloxane elastomers; sulfur containing elastomers such as ethylene polysulfides; acrylic polymers such as methylmethacrylate, acrylonitrile and methylacrylate polymers and copolymers thereof; and organic fabrics such as cotton, linen, silk, wool, rayon, and any of the various synthetic organic fabrics.

The following examples are illustrative only and are not to be construed as limiting the invention which is properly delineated in the appended claims.

*Example 1*

The parts in the following example are parts by weight unless otherwise specified.

A siloxane resin consisting of $SiO_2$ and $Me_3SiO_{.5}$ units was prepared in the following manner. 250 parts of concentrated HCl was diluted with 144 parts of water. The acid was cooled and 432 parts of sodium silicate and 720 parts of water were added with continuous stirring. Immediately following the addition of the sodium silicate 450 parts of isopropanol was added followed by the addition of 222 parts of trimethylchlorosilane and 288 parts of hexamethyldisiloxane. Heat was applied and the mixture was brought to reflux for a period of ½ hour and then cooled. 240 parts of xylene were added and the resin solvent layer was separated from the acid layer. After separation 124 parts of isopropanol were added and the solution was stripped to a temperature of 130 to 135° C. as $CO_2$ was bubbled through the resin solution. The resin solution was adjusted to 75% solids xylene. The $Me_3SiO_{.5}$ to $SiO_2$ ratio of the resulting resin was .8:1.

*Example 2*

A 75% by weight xylene solution of the siloxane resin of Example 1 was mixed with the various hydroxy end-blocked dimethylpolysiloxane fluids having the viscosities shown below in amount so that in each case there was 67% by weight of the siloxane resin to 33% by weight of the hydroxy end-blocked fluid. To each of these solutions was added 3% by weight, based on the total weight of the siloxanes, of a trimethyl end-blocked methyl hydrogen polysiloxane having a viscosity of 25 cs. and 3½% by weight based on the total siloxane solids of dibutyl tin dilaurate. Each solution was brushed on an aluminum panel and on a 1-inch wide strip of dimethylpolysiloxane rubber. The solution was allowed to dry until the film was tacky and the coated surfaces of the rubber and aluminum panel were pressed firmly together. After 24 hours the bond strength between the rubber and the metal was determined in accordance with the following test. The free end of the rubber was folded back at an angle of 180° and was then pulled at the rate of 2 inches per minute in a standard Scott tester. The adhesive strength of the film is recorded in pounds per inch of width of the rubber strip. The adhesive strengths obtained with the various hydroxyl end-blocked dimethylpolysiloxanes are shown below.

| Viscosity in cs. | Adhesive strength in pounds per inch |
| --- | --- |
| 16,000 | 5.5 |
| 25,000 | 8.6 |
| 560,000 | 7 |

Example 3

A mixture of 67% by weight of the siloxane of Example 1 and 33% by weight of a 25,000 cs. hydroxyl end-blocked dimethylpolysiloxane was dissolved in xylene to give a 75% by weight solution. To this was added 3% by weight based on the total siloxane solids of ethylpolysilicate and 3½% by weight based on the weight of the siloxanes of dibutyl tin dilaurate. The resulting solution was applied to aluminum panels and silicone rubber and the panel and the rubber was cemented together in the manner identical to Example 2. After 24 hours the bond strength between the rubber and the aluminum was 3.5 pounds per inch.

Example 4

A hydroxyl end-blocked dimethylpolysiloxane fluid of 25,000 cs. was added to a 75% xylene solution of the siloxane resin of Example 1 in amount such that there was 50% by weight of each of the siloxanes based on their total weight. Lead octoate was added to this solution in amount so that there was .15% by weight lead based on the weight of the total siloxane solids. The solution was then applied to a varnished[1] glass tape. The tape was then heated 20 minutes at 70° C. and then 5 minutes at 150° C. The resulting tape was pressure sensitive and when applied to a stainless steel panel and pulled at an angle of 180° at the rate of 12 inches per minute showed a strength of 1600 g. per inch of width of the tape.

This experiment was repeated employing an 80,000 cs. hydroxyl end-blocked dimethylpolysiloxane and the resulting pressure sensitive adhesive had a strength of 1400 g. per inch based on the width of the tape.

Example 5

Equivalent results are obtained when 15,000 cs. hydroxyl end-blocked fluid having the composition 95 mol percent dimethylsiloxane and 5 mol percent phenylmethylsiloxane is employed in the method of Example 4.

Example 6

Equivalent results are obtained when a resin composed of vinyldimethylsiloxane units and $SiO_2$ units in the ratio of .7:1 is employed in the procedure of Example 2.

That which is claimed is:

1. A composition of matter composed essentially of (1) from 40 to 75% by weight of a benzene soluble resin copolymer of $SiO_2$ units and $R_3SiO_{.5}$ units where R is selected from the group consisting of methyl, ethyl, propyl, vinyl and phenyl radicals, at least 90% of the total R radicals being aliphatic and in which copolymer the ratio of $R_3SiO_{.5}$ units to $SiO_2$ units is from 0.6:1 to 0.9:1 inclusive and (2) from 25 to 60% by weight of a hydroxyl end-blocked diorganopolysiloxane fluid of from 5,000 to less than 1,000,000 cs. viscosity at 25° C. in which fluid the organic radicals are selected from the group consisting of methyl, ethyl, vinyl and phenyl radicals, at least 75% of the total number of organic radicals being aliphatic.

2. A composition of matter in accordance with claim 1 in which all of the organic radicals in siloxanes (1) and (2) are methyl.

3. A composition of matter composed essentially of (1) from 40 to 75% by weight of a benzene soluble resin copolymer of $SiO_2$ units and $R_3SiO_{.5}$ units where R is selected from the group consisting of methyl, ethyl, propyl, vinyl and phenyl radicals, at least 90% of the total R radicals being aliphatic and in which copolymer the ratio of $R_3SiO_{.5}$ units to $SiO_2$ units is from 0.6:1 to 0.9:1 inclusive, (2) from 25 to 60% by weight of a hydroxyl end-blocked diorganopolysiloxane fluid of from 5,000 to less than 1,000,000 cs. vicosity at 25° C. in which fluid the organic radicals are selected from the group consisting of methyl, ethyl, vinyl and phenyl radicals, at least 75% of the total number of organic radicals being aliphatic (3) from .5 to 6% by weight of a cross-linking agent selected from the group consisting of alkoxy polysilicates wherein the alkoxy groups have from 1 to 5 inclusive carbon atoms and siloxanes of the formula

$$R'_nH_mSiO_{\frac{4-n-m}{2}}$$

in which R' is selected from the group consisting of methyl, ethyl, propyl, vinyl and phenyl radicals, n has an average value of from 1 to 2.3, m has an average value from .2 to 1 and the total of $n+m$ is from 1.9 to 2.5 inclusive and (4) a curing catalyst comprising a carboxylic acid salt of a metal ringing from lead to manganese inclusive in the electromotive series of metals.

4. A composition of matter composed essentially of (1) from 40 to 75% by weight of a benzene soluble resin copolymer of $Me_3SiO_{.5}$ units and $SiO_2$ units in the ratio of from 0.6:1 to 0.9:1 inclusive, (2) from 25 to 60% by weight of a hydroxyl end-blocked dimethylpolysiloxane fluid of from 5,000 to less than 1,000,000 cs. viscosity at 25° C., (3) from .5 to 6% by weight of methyl hydrogen polysiloxane and (4) a curing catalyst comprising a carboxylic acid salt of a metal ranging from lead to manganese inclusive in the electromotive series of metal.

5. A pressure sensitive adhesive tape comprising a flexible material having deposited thereon a composition consisting essentially of (1) from 40 to 75% by weight of a benzene soluble resin copolymer of $SiO_2$ units and $R_3SiO_{.5}$ units where R is selected from the group consisting of methyl, ethyl, propyl, vinyl and phenyl radicals, at least 90% of the total R radicals being aliphatic and in which copolymer the ratio of $R_3SiO_{.5}$ units to $SiO_2$ units is from 0.6:1 to 0.9:1 inclusive and (2) from 25 to 60% by weight of a hydroxyl end-blocked diorganopolysiloxane fluid of from 5,000 to less than 1,000,000 cs. viscosity at 25° C. in which fluid the organic radicals are selected from the group consisting of methyl, ethyl, vinyl and phenyl radicals, at least 75% of the total number of organic radicals being aliphatic.

6. A pressure sensitive adhesive tape in accordance with claim 5 in which all organic radicals in siloxanes (1) and (2) are methyl radicals.

References Cited in the file of this patent

UNITED STATES PATENTS

| | | |
| --- | --- | --- |
| 2,442,196 | Coggeshall | May 25, 1948 |
| 2,607,792 | Warrick | Aug. 14, 1952 |
| 2,666,035 | Pfeifer | Jan. 12, 1954 |
| 2,673,843 | Humphrey et al. | Mar. 30, 1954 |
| 2,676,182 | Daudt et al. | Apr. 20, 1954 |

[1] The glass tape was impregnated with a cured emthylphenylsiloxane resin.